C. J. BRISTOL.
AUXILIARY WATER COOLING SYSTEM FOR AUTOMOBILES.
APPLICATION FILED JULY 2, 1917.
1,304,940.
Patented May 27, 1919.
2 SHEETS—SHEET 1.
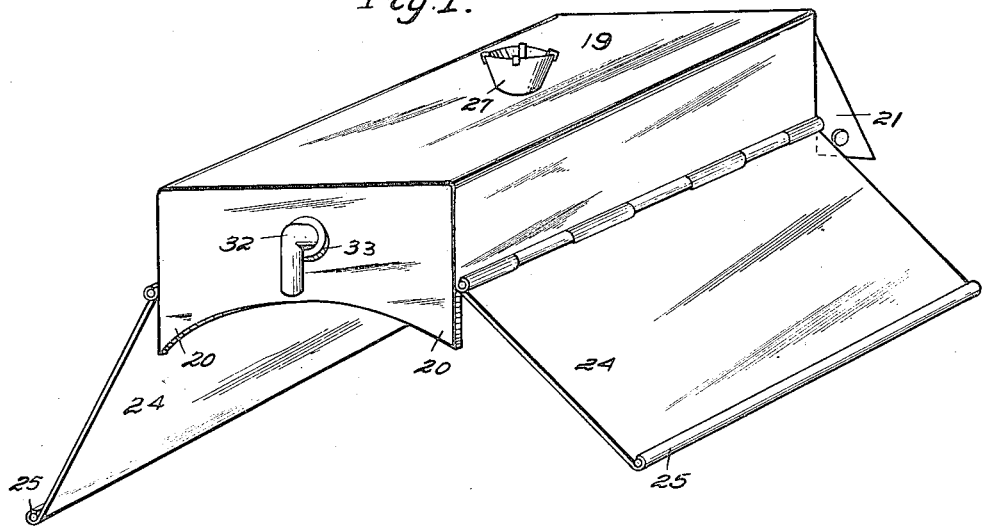
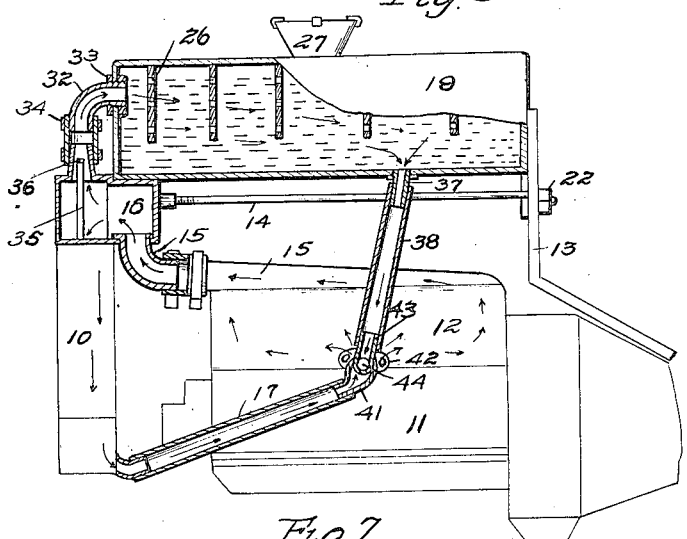
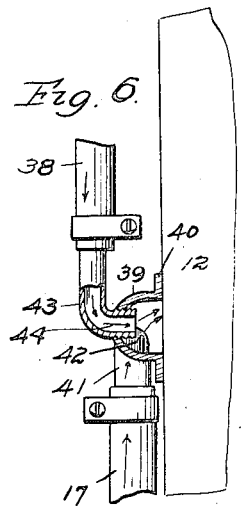
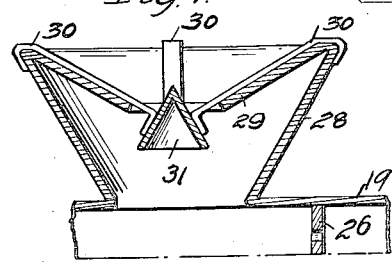
Witness
Will Freeman
Inventor
Cyrus J. Bristol
BY Orwig & Bair
Attys C. J. BRISTOL.
AUXILIARY WATER COOLING SYSTEM FOR AUTOMOBILES.
APPLICATION FILED JULY 2, 1917.
1,304,940.
Patented May 27, 1919.
2 SHEETS—SHEET 2.
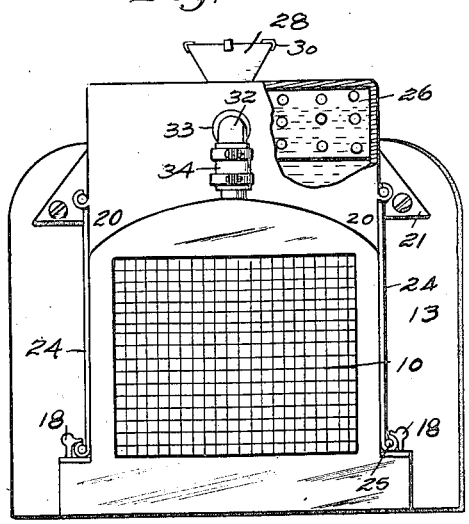
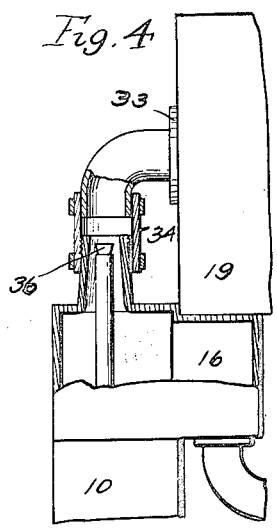
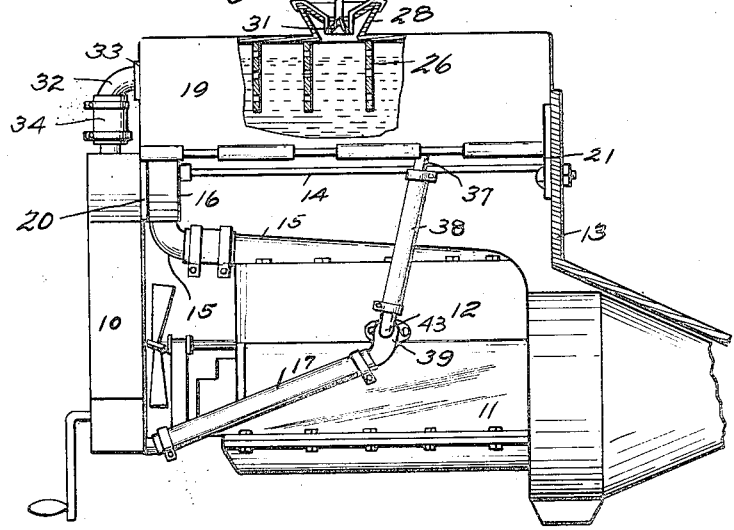

UNITED STATES PATENT OFFICE.

CYRUS J. BRISTOL, OF DES MOINES, IOWA, ASSIGNOR OF ONE-HALF TO GLOBE MACHINERY AND SUPPLY COMPANY, OF DES MOINES, IOWA.

AUXILIARY WATER-COOLING SYSTEM FOR AUTOMOBILES.

1,304,940.   Specification of Letters Patent.   Patented May 27, 1919.

Application filed July 2, 1917. Serial No. 178,316.

*To all whom it may concern:*

Be it known that I, CYRUS J. BRISTOL, a citizen of the United States, and resident of Des Moines, in the county of Polk and State of Iowa, have invented a certain new and useful Auxiliary Water-Cooling System for Automobiles, of which the following is a specification.

The object of my invention is to provide an auxiliary water cooling system for automobiles of simple, durable and inexpensive construction.

A further object of my invention is to provide means for cooling the engine of an automobile whereby the engine may be adapted to run satisfactorily under the conditions caused by converting an ordinary pleasure automobile into a heavy duty truck or tractor.

It will be understood that when a pleasure car is changed to form a tractor or heavy duty truck, the engine is usually required to run for great periods of time while doing very heavy work, so that the cooling system ordinarily provided for the engine has been found unsatisfactory as not presenting sufficient capacity. For this reason, it has been found desirable to provide an auxiliary cooling system adapted to coöperate with the cooling system already provided for the automobile, so that the expense of providing an entirely new system may be avoided and the efficiency of the system already provided may be taken advantage of.

A further object of my invention is to provide an auxiliary water jacket so shaped and so placed that it performs the function ordinarily performed by the hood of the automobile in addition to being a water tank.

A further object is to provide means for filling the entire system without it being necessary to screw or unscrew a cap over the filling opening.

A further object is to provide means disposed within the auxiliary tank for preventing the water therein from splashing around inside the tank or from splashing out through the filler opening, so that the tank may be secured in place by comparatively light weight fastenings, which would be impossible if the water in the tank were allowed to splash and surge back and forth within the auxiliary tank, which would be the tendency caused by the jars of the machine as it was passing over the ground.

A further object is to provide an auxiliary water tank of artistic design, which may be placed over the engine of the automobile with its forward end resting upon the radiator and its rear end secured by a pair of bolts to the tank of the automobile. My tank is also so designed that it is possible to take advantage of the filler neck at the top of the radiator to connect the interior of the radiator with the interior of the auxiliary tank.

A further object is to provide a duplex water circulation so that a circulation of water from at least one of the circulating systems is insured at all times and the more uniform water temperature is secured.

With these and other objects in view my invention consists in the construction, arrangement and combination of the various parts of the device whereby the objects contemplated are attained, as hereinafter more fully set forth, pointed out in my claims, and illustrated in the accompanying drawings, in which:

Figure 1 shows a perspective view of my invention.

Fig. 2 shows a front elevation of my invention installed upon an automobile with parts broken away to better illustrate the construction and only the necessary parts of the automobile appearing.

Fig. 3 shows a side elevation with sides broken away to better illustrate the construction with the radiator, dash and engine of the automobile shown.

Fig. 4 shows a side elevation of the portion of the device illustrating the connection between my auxiliary water tank and the filler neck of the radiator, parts being broken away to better illustrate the construction.

Fig. 5 shows a side elevation with certain of the parts shown in section in order to illustrate the water circulation and showing the radiator and engine of the automobile in light lines.

Fig. 6 shows an end elevation partly in section of the intake connection of the water jacket of the engine, and Fig. 7 shows a vertical, central, sectional view of the portion of the auxiliary tank and the nonsplashing filler neck fixed thereon.

Referring to the accompanying drawings I have used the reference numeral 10 to indicate the radiator of an automobile having an engine 11, a water jacket 12 and a tank 13. A rod 14 usually extends between the radiator and the tank. The upper portion of the water jacket 12 communicates through pipe 15 with the rearwardly extending chamber 16 at the top of the radiator 10. The lower portion of the water jacket 12 communicates through the pipe 17 with the lower portion of the radiator 10. These parts are all of ordinary construction and are common in internal combustion engine automobiles.

The hood usually provided for automobiles consists of leaves, which are hinged longitudinally at their upper portions and have their lower portions secured to the frame of the automobile by spring latches 18. A pintle rod usually extends across between the radiator and the tank and is designed to set in notches provided in the radiator and dash, so that the hood may be lifted off when it is desired to do so.

I provided an auxiliary water tank 19, which is designed to have a downwardly projecting flange 20 having its lower edge shaped to fit the top of the radiator above the chamber 16 and a pair of outwardly extending brackets 21 at its rear end, which are secured to the dash by suitable bolts 22. It will be seen that the flange 20 rests upon and fits against the upper surface of the radiator while the rear end of the tank is fixed to the dash by brackets 21, so that the dash may be held from movement. There is ordinarily a shoulder provided at the top of the radiator wherein the hood usually provided is inset, so that the flange 20 by coacting with this shoulder 23 prevents a strain on the brackets 21 caused by a forward throw of the tank 19. The sides of the tank 19 are provided with hinged leaves 24, which extend down to the frame of the automobile whereby these leaves may be held from movement when they are swung to position to close the space between the tank and the frame of the automobile.

The auxiliary tank 19 is provided with a plurality of transverse spaced perforated baffle plates 26, which extend downwardly from the top of the tank and in the inside thereof to prevent sudden surges of water from one end of the tank to the other caused by movement of the automobile. These baffle plates also help to prevent splashing through the filler neck 27 of the tank 19.

The filler neck which I have provided is designed to both prevent the water in the tank from splashing out and to permit steam to escape from the tank when the water therein becomes hot. In order to accomplish this purpose I have provided an upwardly and outwardly extending flange 28 around the filler opening in the top of the tank 19, which has at its upper edge a downwardly and inwardly extending portion 29, the angle of inclination from the vertical of this latter flange being greater than the angle of inclination of the flange 28. A plurality of gripping fingers 30 have one end hooked over the upper edge of the flange 28 and extend downwardly along the upper surface of the flange 29 usually opening in the center thereof. A cone shaped member 31 has its vertex extended somewhat through the opening in the flange 29 and is supported by the inner ends of the fingers 30. The cone shaped member 31 is of such size that it may be lifted out through the opening through the flange 29 by releasing the hooked ends of the fingers 30 and pulling up on them. It will be seen that any water that splashes up between the adjacent baffle plates against the top and through the filler opening will only splash up into the V shaped retaining space between the flanges 29 and 28 or into the bottom of the cone 31 instead of being thrown outside the tank by jars of the automobile.

At the forward upper end of the tank 19 a tube 32 is inserted and may be water tight by any suitable means as for instance the threaded washers 33. The tube 32 is curved at its forward end downwardly so that its free end is disposed directly above the filler neck of the radiator and the suitable flexible connection 34 is adapted to permit communication between the filler neck and the tube 32. The over flow tube 35, which is always provided with the radiators of automobiles, has its upper end closed by any suitable means as for instance the plug 36. Adjacent to the rear end of the bottom of the tank 19, a short flexible tube 37 is set in and a second tube 38 is secured to the free end thereof. The pipe 38 is designed to be connected with the intake of the water jacket 12 of the engine and I have provided the following means for accomplishing this result. The automobile engine is ordinarily provided with a water jacket and an elbow, which communicates therewith adjacent to the lower portion of the water jacket and is connected to the tube 17. I have substituted for the elbow usually provided a bell shaped connection 39, which has a flange 40 adapted to be secured in any suitable manner to the outer surface of the water jacket. The interior of the bell shaped connection 39 opens into the interior of the water jacket 12. The tube 17 which connects the water jacket inlet with the bottom of the radiator is secured to a nipple 41, which opens into the bell shaped connection at 42. A second nipple 43 opens into the bell shaped connection at 44 and is connected to the tube 38, which extends upwardly to the bottom of the auxiliary tank 19.

It will be seen from the foregoing that I have provided a double water circulating system wherein two independent circulations are employed for cooling the water, which passes through the water jacket of the engine. This double circulation is insured by the arrangement of the parts and their connection and operative effect upon the water contained therein. Starting with the water jacket of the engine, it will be seen that the water therein will be heated and thereby caused to rise up through the outlet pipe 15 into the chamber 16. This convection causes a cooler water from the tank 19 and the radiator 10 to be drawn in through the water jacket inlet 39. Removing the water from above the radiator and the tank 19 causes the heated water in the chamber 16 to divide, part rising to the tank 19 through the connection 32 and part descending through the radiator 10. It will thus be seen that a circulation from the chamber 16 through the tank 19 and tube 38 is established and a second circulation is established through the radiator 10 and tube 17. This double circulation is additionally insured by the comparatively great cooling effect of the radiator, which insures that a portion of the heated water, which rises to the chamber 16 will be drawn down through the radiator 10. From the foregoing, it will be seen that the water from the radiator and the tank is mixed where it enters the water jacket through the connection 39 and whereby the resulting temperature of the water entering the water jacket will be the average between the temperature of the tank and the temperature of the radiator. In practical operation this, however, results in maintaining a substantially uniform temperature of all the water in the system, this temperature, however, being uniform in the sense that the heated water entering the chamber 16 is cooled approximately the same amount whether it passes through the radiator 10 or through the tank 19.

It will be seen that I have provided a combined auxiliary water tank or system and hood, which may be applied to the automobile with a minimum of trouble and expense and without substantially changing the appearance of the automobile from one of usual design. By setting the tank 19 above the engine in the place ordinarily occupied by the top portion of the hood and then providing the leaves at the lower side edges of the tank like the leaves of the ordinary automobile hood, the resulting appearance conforms to the accepted designs for automobile hoods. The attachment of my tank merely requires two holes to be bored through the dash of the automobile to receive the bolts 22, and the removal of the hood provided with the machine and substitution of my improved water jacket intake connection for the elbow provided with the automobile.

I have further connected the hot water intake of the auxiliary tank 19 with the filler neck of the automobile hood whereby it is unnecessary to make extra openings in the radiator or other portion of the cooling system of the automobile and whereby the heated water from the engine may be conducted by the shortest possible route to the tank 19. I have further so arranged the interior of the tank 19 by the use of the baffle plates 26 that it is unnecessary to provide fastenings of great strength to care for the sudden strain, which would be caused in the water if the tank were allowed to surge back and forth with the movement of the machine upon which it is mounted. The use of the form of the filler neck provided for the tank 19 in combination with the baffle plates therein permits a steam vent for the water to be inoperative at all times, yet prevents the water from splashing out of the tank through the filler neck.

An advantage of the duplex circulating system provided resides in the fact that even though one of the cooling tanks should become clogged, the other circulating medium would undoubtedly remain open and permit the engine to be kept cool for a long time even though the engine had to be run. This duplex system presents a further advantage that the water entering the water jacket of the engine is at a temperature substantially the average and between the temperature of the two systems, so that this water, which enters the water jacket will be at its highest efficiency at that time. The arrangement shown permits the two systems to be used in combination with the minimum of additional parts and expense of installation thereby securing to the efficiency of a cooling system having a capacity adequate to the duty which the engine is performing without expense of installing an entirely new system.

I claim as my invention:

1. In a combined automobile hood and auxiliary water tank, a combined tank and hood top designed to extend between the radiator and dash of an automobile, a downwardly extending flange secured to the forward end of the last described member having its lower edge shaped to conform to the lines of the radiator top and adapted to rest thereon, means for supporting the rear end of the tank and hood top adjacent to the dash of an automobile, hood sides hinged at their upper edges to the tank and hood top and adapted to have their lower edges swing forwardly and outwardly, said hood sides being adapted to coact with the hood locking means of an automobile, and means for operatively connecting the tank portion with the water cooling system of an automobile.

2. In a combined automobile hood and auxiliary water tank, a combined tank and hood top designed to extend between the radiator and dash of an automobile, a downwardly extending flange secured to the forward end of the last described member having its lower edge shaped to conform to the lines of the radiator top and adapted to rest thereon, a pair of laterally extending brackets fixed to the rear end of the tank and hood top and having openings therein, a pair of bolts adapted to pass through said openings and through the dash of an automobile whereby said brackets may be secured to the dash, hood sides hinged at their upper edges to the tank and hood top and adapted to have their lower edges swing upwardly and outwardly, said hood sides being adapted to coact with the hood locking means of an automobile, and means for operatively connecting the tank portion with the water cooling system of an automobile.

3. In an auxiliary water cooling system for automobiles a communicating tank adapted to extend between the radiator and the dash above the engine, means for establishing a communication between the interior of said receptacle and the filler neck of the automobile radiator, means for closing the intake end of the over flow tube in the radiator, means for establishing a communication between the interior of the receptacle and the intake opening of the water jacket of the engine, and means for permitting steam to escape from the top of the receptacle.

4. In an auxiliary water tank adapted to be mounted on an automobile and to communicate with the water cooling system thereof, a receptacle having an opening in the top thereof, an annular upwardly and outwardly extending flange fixed within said opening, a funnel shaped member having its larger end mounted on the upper edge of said flange, a cone shaped member disposed with its vertex received within the lower opening of the funnel shaped member and its base disposed within the opening in the top of the receptacle, and a plurality of resilient fingers adapted to be secured to the base of the cone shaped member and to extend upwardly through and to be secured to the funnel shaped member.

5. In an auxiliary water tank adapted to be extended between the radiator and dash above the engine of an automobile, and communicating with the water cooling system thereof, an elongated liquid receptacle supported at its forward end by the radiator and secured at its rear end to the dash, and a plurality of transverse, spaced, perforated baffle plates extended from position spaced vertically from the bottom of the tank to the top of the tank whereby surges of the liquid in the tank may be eliminated while circulation of the liquid through and below the baffle plates may be insured.

Des Moines, Iowa. June 28, 1917.

CYRUS J. BRISTOL.